Sept. 24, 1963 R. W. TRIPP 3,105,142

DIGITAL-TO-ANALOG CONVERTER WITH ZERO OFFSET

Filed May 10, 1961 7 Sheets-Sheet 1

INVENTOR.
ROBERT W. TRIPP

BY W. E. Beatty

ATTORNEY

DIGITAL-TO-ANALOG CONVERTER WITH ZERO OFFSET

Filed May 10, 1961

INVENTOR.
ROBERT W. TRIPP
BY W E Beatty
ATTORNEY

INVENTOR.
ROBERT W. TRIPP
BY W E Beatty
ATTORNEY

INVENTOR.
ROBERT W. TRIPP
BY W. E. Beatty
ATTORNEY

INVENTOR.
ROBERT W. TRIPP
BY W. C. Beatty
ATTORNEY

*INVENTOR.*
ROBERT W. TRIPP

*BY* W. E. Beatty

ATTORNEY

Sept. 24, 1963 R. W. TRIPP 3,105,142

DIGITAL-TO-ANALOG CONVERTER WITH ZERO OFFSET

Filed May 10, 1961 7 Sheets-Sheet 7

*INVENTOR.*
ROBERT W. TRIPP

BY W. E. Beatty

ATTORNEY

United States Patent Office
3,105,142
Patented Sept. 24, 1963

3,105,142

DIGITAL-TO-ANALOG CONVERTER WITH ZERO OFFSET

Robert W. Tripp, Eastchester, N.Y., assignor to Inductosyn Corporation, Carson City, Nev., a corporation of Nevada Filed May 10, 1961, Ser. No. 109,078
17 Claims. (Cl. 235—154)

This invention relates to a digital-to-analog converter which will accept digital input information, on a decimal or other basis, of the desired extent of travel of a driven element such as a machine element or tool in terms of input data of the workpiece co-ordinate and other input data representing the zero offset between the workpiece zero and machine zero, with a converter for producing corresponding analog voltages representing the desired travel of the driven element.

A further object of this invention is to provide a digital-to-analog converter capable of simultaneously accepting two multidigit inputs and providing analog voltages representative of the positions corresponding to the sum of the two multidigit numbers.

A further object of the invention is to provide a digital-to-analog converter capable of providing analog information to data elements in several grades and to further provide a single digit input in the least significant digit of all but the finest grade in order to adjust the zeros of the various data elements to a common point. While the converter can be used with various data elements such as resolvers, or synchros, it is particularly adaptable to use with an Inductosyn[1] and more particularly with an Inductosyn in a form wherein the coarse, medium and fine windings of the slider, as well as the scale, each appear on a common support, as described and claimed in patent application S.N. 29,972, filed May 18, 1960 for Precision Transducers.

Another object of the invention is to provide convenient means whereby an operator can determine the number corresponding to the necessary zero offset between the machine co-ordinate zero and the workpiece co-ordinate zero. The zero offset feature, in a different form, is described in Patent 2,950,427, issued August 23, 1960, to R. W. Tripp.

It is a further object of the invention to permit convenient determination of the zero offset number whether the initial positioning of the workpiece with respect to the work point represents a workpiece co-ordinate zero or any other dimension.

Another object of the invention is to permit convenient storage in the equipment of the zero offset number determined while providing means for easily changing the multidigit input number representing the workpiece co-ordinate in order to obtain new voltages representative of the new workpiece position.

In operation, the operator selects the desired zero offset and the co-ordinate position and sets rotary switches controlling the computer to the corresponding co-ordinate position. The table is then moved by handle or motor driven and controlled by a jog switch until an error meter is at null, indicating that the desired position has been reached. Alternatively a servo motor can be controlled by the error signal.

For further details of the invention reference may be made to the drawings wherein FIG. 1 is a block diagram of a digital-to-analog converter employing a manual switch input according to the present invention, illustrating the association of the manually controlled switching devices, for coarse, medium and fine grades, in combination with a null meter, the null reading of which is indicative of correspondence between the multidigit numbers on the dials of the various switches, corresponding to the particular value of zero offset and workpiece data and the position of the machine.

[1] Registered.

FIG. 2 is a schematic diagram illustrating the overlap between the last stage of the coarse converter and the first stage of the medium converter, and also between the last stage of the medium converter and the first stage of the fine converter, the output of these coarse, medium and fine converters each being sine and cosine values or other trigonometrical values which correspond to the geometrical spacing of the windings on the slider or movable element of the data element.

Figure 2:
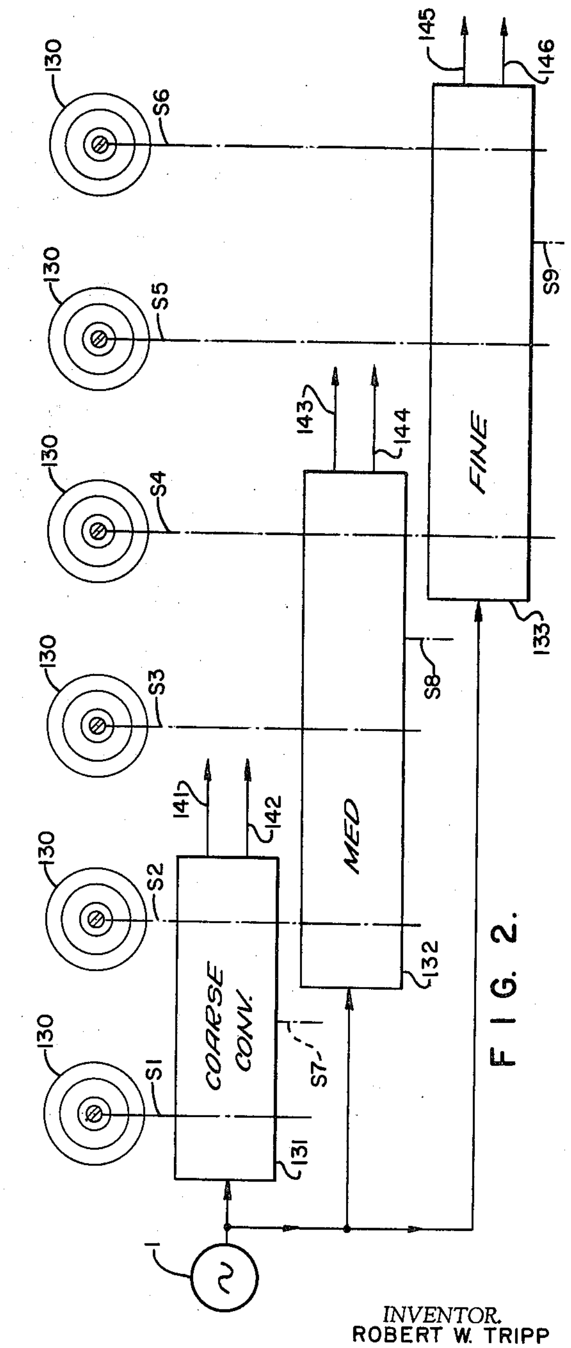
Figure 12:
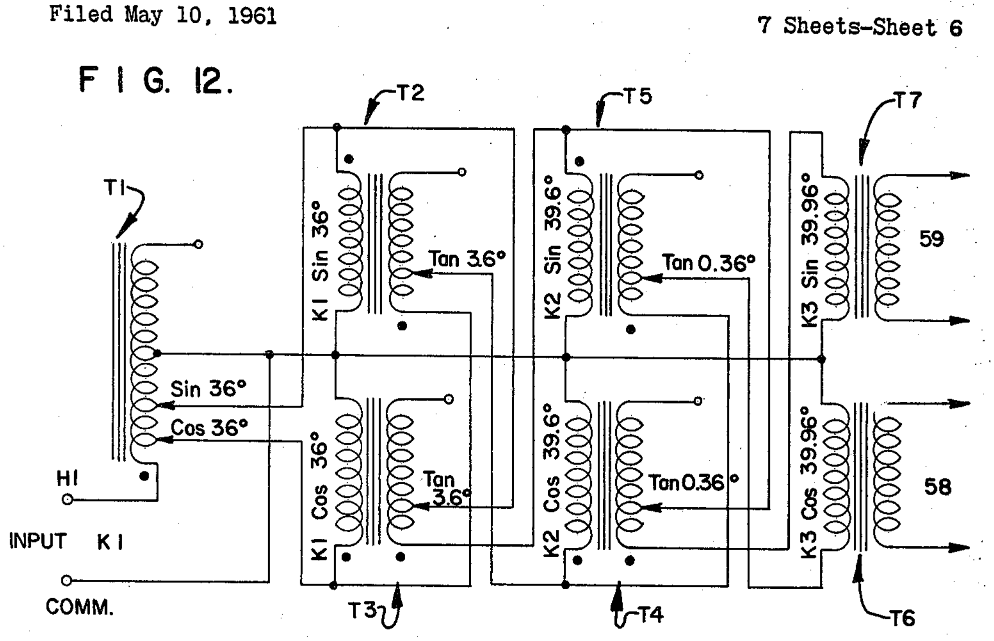

FIG. 12 is a schematic and simplified circuit diagram corresponding to FIG. 2 of Patent 2,849,668, issued August 26, 1958, to R. W. Tripp and is illustrative of the circuit employed in the medium and fine converters of FIG. 2.

Figure 13:
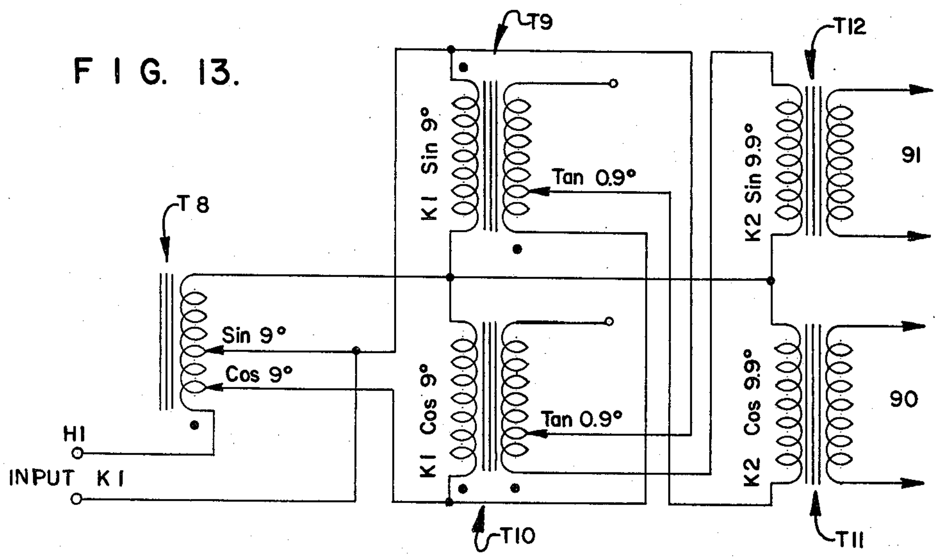

FIG. 13 is a circuit diagram similar to FIG. 12 and showing the particular circuitry employed in the coarse converter of FIG. 2.

Figure 5:
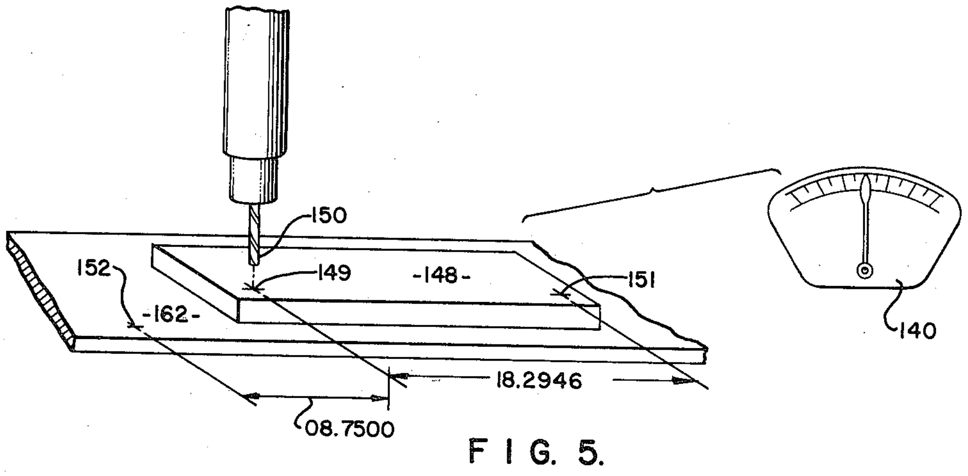
FIG. 5 is a diagram useful for explaining the operation of the invention when the co-ordinate zero of the workpiece is initially positioned at the work point.
Figure 6:
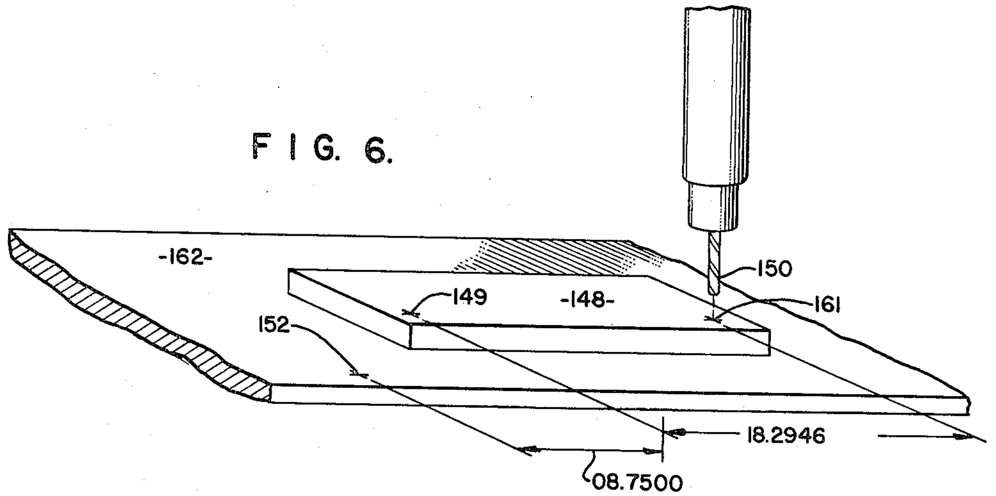
FIG. 6 is useful in explaining the operation of the invention in obtaining the zero offset where the co-ordinate of the workpiece which is initially aligned to the work point has a dimension other than zero.
Figure 14:
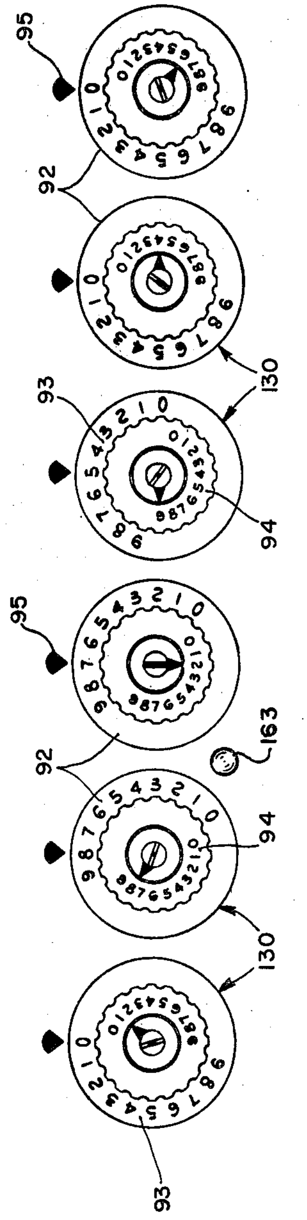
Figure 15:
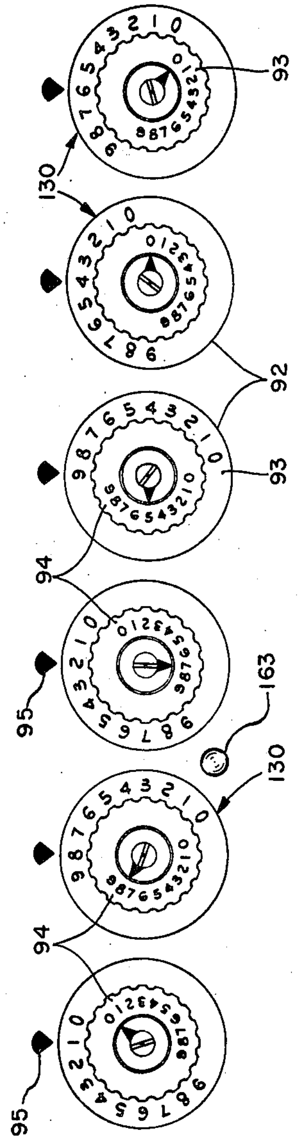

FIGS. 14 and 15 are plan views of the input knobs and their scales and are used in conjunction with FIGS. 5 and 6 to describe methods of setting zero offset.

Figure 1:
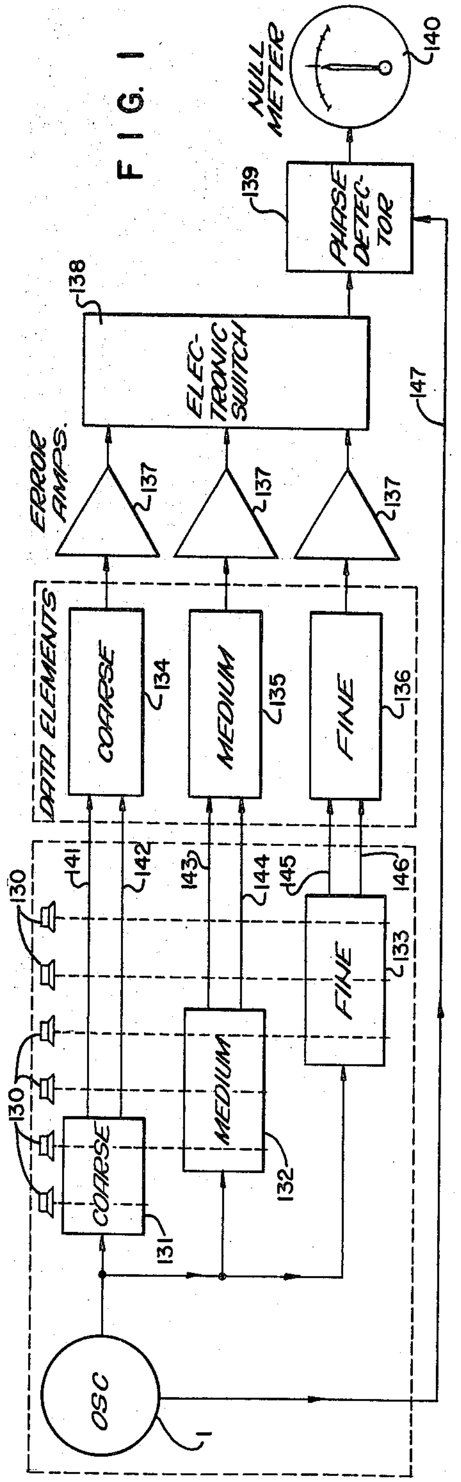
Figure 7:
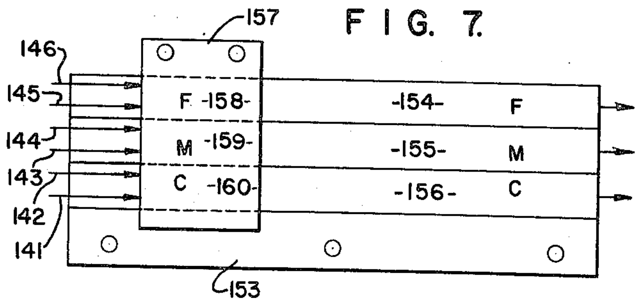
FIG. 7 is a schematic plan view of a triple Inductosyn.

FIG. 1 is a block diagram showing a simple embodiment of the invention. The voltage developed by oscillator 1 is fed to the inputs of the coarse converter 131, the medium converter 132, and the fine converter 133. Data input to these converters is provided by six knob assemblies 130. The arrangement of converters 131, 132 and 133 with their associated shafts and knob assemblies 130 is shown in more detail in FIG. 2. The sine output 141 and the cosine output 142 from the coarse converter 131 connect to the two-winding members of the coarse data element 134. Similarly, the sine output 143 and cosine output 144 of the medium converter 132 connect to the two-winding members of the medium data element 135. The sine output 145 and the cosine output 146 of the fine converter 133 connect to the two-winding members of the fine data element 136. The data elements 134, 135 and 136 may be resolvers, synchros, Inductosyns, and particularly a triple Inductosyn as shown in FIG. 7. The error signals from the single-winding members of data elements 134, 135 and 136 are amplified in amplifiers 137. The electronic switch 138 serves to select the coarse error signal when it is comparatively large, the medium error signal when the coarse error signal is comparatively small, the fine error signal when both the coarse and medium errors are comparatively small. The mixed error signal out of electronic switch 138 is phase detected in the phase detector 139 which obtains its phase reference by circuit 147 from oscillator 1. The magnitude and polarity of the D.C. error signal out of the phase detector 139 is indicated on the null meter 140.

The use of the error signal from phase detector 139 to control an automatic servo system is well known in the art and is not diagrammed here.

FIG. 2 illustrates the general arrangement of a coarse converter 131, a medium converter 132, and a fine converter 133 with their input knob assemblies 130 on shafts S1 through S6. The coarse converter 131 is shown in detail in FIG. 4. The fine converter 133 is shown in detail in FIG. 3. The medium converter 132 is identical to the fine converter 133, except that shafts S4, S5 and S6 of FIG. 3 become shafts S2, S3 and S4, respectively, when used as the medium converter 132. This figure also shows the one-digit overlap on shaft S2 between the coarse converter 131 and the medium converter 132. Likewise, it shows the one-digit overlap at shaft S4 between the medium converter 132 and the fine converter 133. Shaft S7 provides a one-digit adjustment of converter 131, shaft S8, a one-digit adjustment of converter 132, and shaft S9, a one-digit adjustment of converter 133. In practice, the adjustment by means of shaft S9 of the fine converter is usually unnecessary, and shaft S9 can be omitted. In this case, a fixed strap is incorporated in switches SW11 and SW12 of FIG. 3 to give the circuit equivalent of swingers at the zero position.

Figure 3:
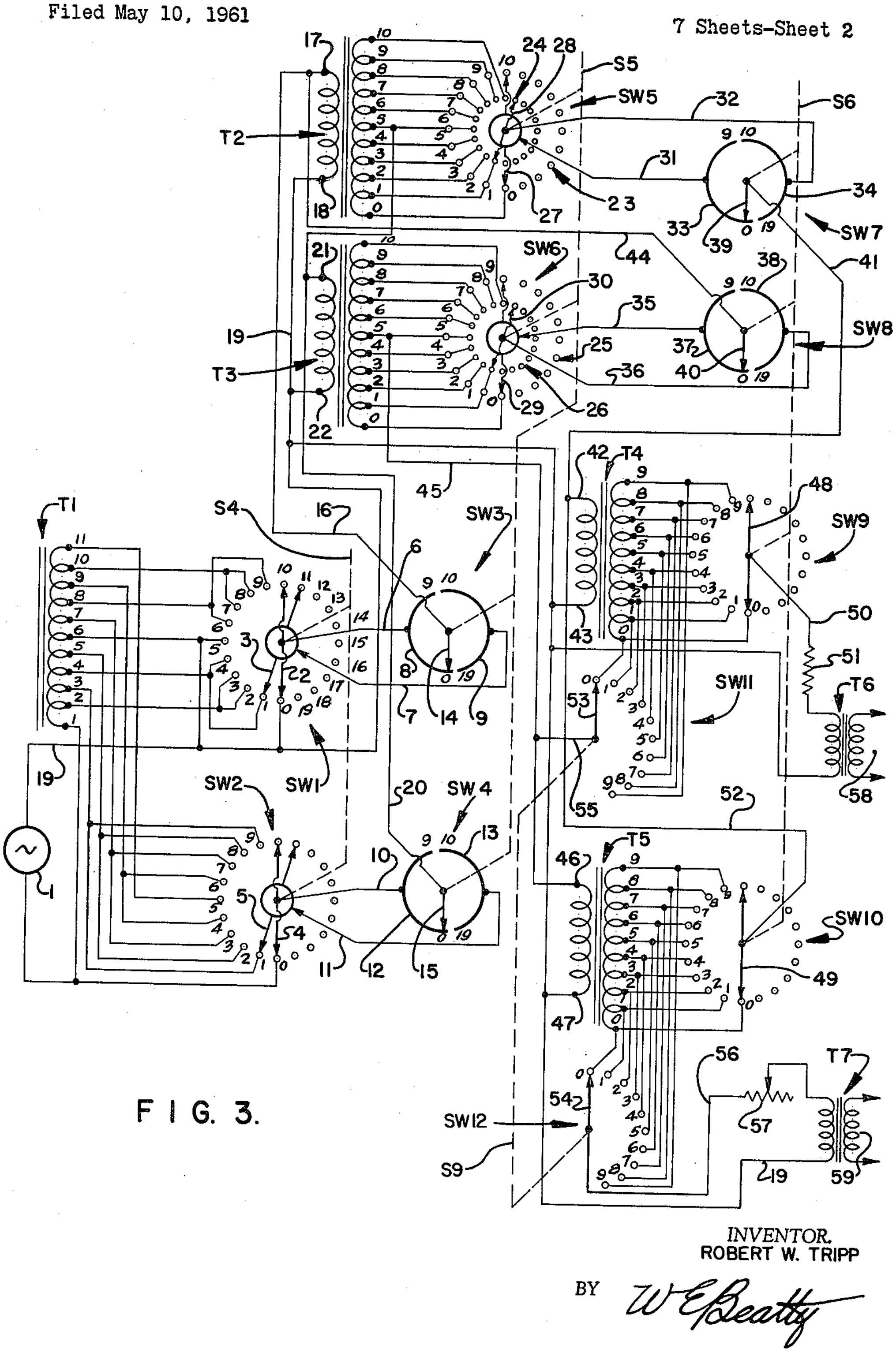
FIG. 3 is a detail diagram of the digital-to-analog converter in the medium and fine blocks in FIG. 2.

With reference to FIG. 3, an alternating voltage from the oscillator 1 is applied to taps 1 and 6 of autotransformer T1. Voltages are developed at the taps of transformer T1 corresponding to sine and cosine of 36 degree steps. These taps are connected to the contacts of switches SW1 and SW2 in such a manner that the voltage developed between a numbered contact on switch 1 and the common terminal 6 of transformer T1 is proportional to the sine of the angle obtained by multiplying 36 degrees by the number of the tap, and the voltages developed between the numbered contacts of switch SW2 and the common terminal 6 of the transformer are proportional to the cosine of 36 degrees multiplied by the number of the tap. Switches SW1 and SW2 each include a rotary member attached to shaft S4, each of the rotary members carrying a pair of double-ended swingers like 2 and 3 arranged to contact the fixed contacts of the respective switches and angularly displaced from each other by the angle which separates two successive fixed taps on the switch.

Swinger 2 is connected by wire 6 to an extended contact 8 on switch SW3, the extent of the contact corresponding to the range of digits zero to nine on this switch.

Each of the shafts S1 through S6 has a detent mechanism to position it to one of 20 equally spaced angular positions. Likewise, the contacts on the switches SW1 through SW20 are arranged on an 18-degree module corresponding to the same 20 shaft positions. The switch contact positions are identified by the numbers 0 through a maximum of 19, with the numbers increasing in a clockwise direction.

Swinger 3 is connected through wire 7 to a switch contact 9 on switch SW3 which extends from position 10 to 19. Similarly, swinger 4 of switch SW2 is connected by wire 10 to contact 12 which extends from position zero to 9 on switch SW4, and swinger 5 of switch SW2 is connected by wire 11 to extended contact 13 between positions 10 and 19 on switch SW4.

Switch SW3 has a single-ended swinger 14 which is connected by wire 16 to one input 17 of the primary of the transformer T2. The other input 18 to the primary of transformer T2 is connected by wire 19 to the common input from oscillator 1 which also appears at tap 6 on transformer T1.

Similarly, switch SW4 has a single-ended swinger 15 which is connected by wire 20 to one input 21 of the primary of transformer T3. The other primary input 22 of transformer T3 is likewise connected by wire 19 to the common side of oscillator 1. Swingers 14 and 15 are both connected to shaft S5.

The secondary winding of transformer T2 has 11 taps numbered zero to 10. The voltage developed between any tap and the common tap 5 is proportional to the tangent of the angle obtained by multiplying 3.6 degrees by the number of intervals that the tap is distant from the common tap 5. Taps 6 to 10 represent positive values of angles, while taps zero to 4 represent negative values of the angle. It will be noted that the common tap is at position 5, while in the simplified showing of FIG. 12 the common tap is at one end of the tangent winding. Since the constant K2 in FIG. 12 is equal to K1 multiplied by the secant of the electrical angle at the secondary of transformer T2, and since the secant function, while not affecting the accuracy of the converter, does have a proportional effect on the gain, a reduction in the magnitude of this variation is obtained by reducing the absolute magnitude of the angle variation in this transformer by using an angular excursion of both plus and minus, resulting in a maximum absolute magnitude half of that obtained in FIG. 12.

The taps on transformer T2 are connected to corresponding contacts on switch SW5. Switch SW5 has an outer set of contacts 23 and an inner set of contacts 24. Taps 1 through 9 on transformer T2 connect to corresponding taps 1 through 9 on both the outer 23 and inner 24 contacts on switch SW5. Tap zero on transformer T2 connects only to the zero contact of the outer set 23. Tap 10 of transformer T2 connects only to contact 10 on the inner set 24.

Transformer T3 is identical to transformer T2 and its taps are similarly connected to the outer contact set 25 and the inner contact set 26 of switch SW6.

Switch SW5 has a double-ended swinger 27 arranged to contact the outer set of contacts 23 and a double ended swinger 28 offset 1 step in a clockwise direction from swinger 27 and arranged to engage the inner set of contacts 24. Likewise, switch SW6 has an outer swinger 29 and an inner swinger 30 which is advanced in a clockwise direction one step from swinger 29.

Swingers 27, 28, 29 and 30 are mounted on shaft S5 which also carries swinger 14 of switch SW3 and swinger 15 of switch SW4. These swingers are phased as shown in FIG. 3 so that swingers 14, 15, 27 and 29 are at zero, and swinger 28 and 30 are at position 1 for a zero position of shaft S5.

Swinger 27 of switch SW5 is connected by wire 31 to the extended contact 33 of switch SW7 which extends over the range of contacts zero to 9. Likewise, swinger 28 is connected by wire 32 to extended contact 34 on switch SW7 which extends from contact positions 10 to 19.

Swinger 29 of switch SW6 is connected by wire 35 to the extended contact 37 on switch SW8, which extends from contact positions zero through 9. Swinger 30 of switch SW6 is connected by wire 36 to extended contact 38 on switch SW8 which extends from contact positions 10 to 19.

Single-ended swinger 39 on switch SW7 and swinger 40 on switch SW8 are mounted on shaft S6 for rotational engagement with their respective contact segments 33, 34, 37 and 38.

Swinger 39 is connected by wire 41 to one input 42 of the primary of transformer T4. The other input 43 of the primary of transformer T4 is connected by wire 19 to the common of oscillator 1.

Swinger 40 of switch SW8 is connected by wire 44 to the primary input 17 of transformer T2.

The common tap 5 on transformer T3 is connected by wire 45 to one input 46 of the primary winding of transformer T5. The other input 47 of this primary winding is connected by wire 19 to the common of the oscillator 1.

The secondary of transformer T4 has 10 taps numbered zero through 9. The voltage between any tap and the common tap zero is proportional to the tangent of the angle represented by multiplying the number of the tap by 0.36 degrees. The taps on transformer T4 are connected to the correspondingly numbered contacts on switches SW9 and SW11. Likewise, the secondary taps on transformer T5, which is identical to transformer T4, are connected to the correspondingly numbered contacts on switches SW10 and SW12.

Switch SW9 has a double-ended swinger 48. Switch SW10 has a double-ended swinger 49. Swingers 48 and 49 are mounted on shaft S6 and are arranged so that swingers 39, 40, 48 and 49 are all at contact zero when shaft S6 is at position zero.

The swinger 48 is connected through wire 50 and resistor 51 to the primary of transformer T6. The swinger 49 is connected through wire 52 to the primary input terminal 42 of transformer T4. The other side of the primary of T6 is connected by wire 19 to the common of oscillator 1.

Switch SW11 has a single-ended swinger 53, and switch SW12 has a single-ended swinger 54. Swingers 53 and 54 are mounted for rotation by shaft S9. Swinger 53 is connected by wire 55 to the input 46 of transformer T5. Swinger 54 is connected by wire 56 through variable resistor 57 to one side of the input of transformer T7. The other side of the input of transformer T7 is connected by wire 19 to the common of oscillator 1.

If shaft S9 is set at zero so that the swingers 53 and 54 are on the contacts marked zero, the voltage at the output winding 58 of transformer T6 represents the cosine of the sum of the angles represented by the positions of shafts S4, S5 and S6. Similarly, the voltage across the secondary 59 of transformer T7 represents the sine of the sum of the angles represented by the positions of shafts S4, S5 and S6.

If shaft S9 is positioned so that swingers 53 and 54 are at some position other than zero, the voltages developed in the secondaries 58 and 59 will represent the cosine and sine respectively of the sum of the angles represented by shafts S4, S5, S6, plus the value represented by the position of shaft S9.

When switches SW11 and SW12 are set at zero and when all switches on shafts S4, S5 and S6 are operating at positions between zero and 9, the effect of the circuit of FIG. 3 is the same as that of FIG. 12.

Fixed resistor 51 and variable resistor 57 are provided to permit adjustment of the relative voltage levels of the sine and cosine outputs in order to obtain correct signals at the data elements even though the data elements and connecting lines differ in impedance. Resistors 83 and 89, FIG. 4, perform the same function for the coarse system.

The circuit of FIG. 12 performs the same function as the circuit of FIG. 2 of Patent No. 2,849,668. The circuit of FIG. 12 differs in detail from the circuit of FIG. 2 of the above patent in that in FIG. 12 the secondary unity windings of FIG. 2 of the above patent have been replaced by direct connections to the primaries of the respective transformers. The details of the computation through the use of the tapped transformers is set forth in detail in the above patent.

The operation just described with shafts S4, S5 and S6 limited in rotation to the positions zero to 9 represents the normal case of a single multidigit input to the converter. Since this converter is designed to accept the sum of two multidigit numbers, and since like digits are summed by their respective shafts as later described, the range of rotations of these shafts is from zero to 18. When the position of shaft S6 is between 10 and 18, the less significant digit is supplied to the switches SW9 and SW10. This is accomplished by the use of the double-ended swingers 48 and 49 arranged so that after the first 10 positions, the contact connection sequence repeats for the succeeding positions. For example, in the position shown in FIG. 3, the swingers 48 and 49 represent either zero or 10. Where the shaft position is 10 or greater, the 10 is carried into the next more significant stage by advancing the connections to the taps of transformers T2 and T3 by one step. The operation for transformer T2 is as follows: swinger 39 which is connected to swinger 27 through wire 31 and contact segment 33 for the first 10 positions of shaft S6 will, for shaft positions greater than 9, be connected to swinger 28 through wire 32 and contact segment 34. Since swinger 28 is one step in advance of swinger 27, and since the effect on the output voltages of 1 step on shaft S5 is the same as 10 steps on shaft S6, the excess 10 on shaft S6 is transferred or carried to the stage on shaft S5. Switches SW6 and SW8 cooperate in the identical manner to perform the carry with respect to transformer T3.

As previously pointed out, the swingers 27 and 29 cover a range of transformer taps of zero to 9, while the advanced swingers 28 and 30 cover the range of taps from 1 to 10. By allowing the advanced swingers to go to tap 10, any requirement for a double carry is eliminated. Otherwise, if shaft S5 were at position 9 and a carry occurred from shaft S6, this would call for an additional carry into shaft S4. This double carry is eliminated by allowing the analog voltage developed in transformers T2 and T3 to go to a magnitude representing shaft position 10.

In a similar manner, switches SW3 and SW1 cooperate to perform the carry from shaft S5 to shaft S4 for the sine function of transformer T1, and switches SW4 and SW2 cooperate to perform the same carry respect to the corresponding cosine function.

Since 10 steps on transformer T1 represent a full cycle, 360 degrees, the cycle will repeat after 10 steps, and no further carry is required.

Switches SW11 and SW12 mounted on shaft S9 are provided to permit the addition of a single digit in the fine stage of the converter. This is convenient and sufficient to obtain an independent small adjustment of the zero of the converter for the purpose of obtaining effective alignment of the several date elements used in a multispeed system. Since the tangent function over the range of values of transformers T4 and T5 is essentially linear, the voltages developed between swingers 48 and 53 and between 49 and 54 will be proportional to the tangent of 0.36 degree multiplied by the difference between the positions of shafts S6 and S9. Thus, the output of the converter will represent a position corresponding to the positions of shafts S4, S5 and S6, minus the position represented by shaft S9. If the taps of switches SW11 and SW12 are numbered in the reverse order, the effect of shaft S9 becomes a sum rather than a difference. In practice, since this setting is used only in the initial alignment of the system, the operator need not know the position of shaft S9, and no dial need be attached thereto.

Figure 4:
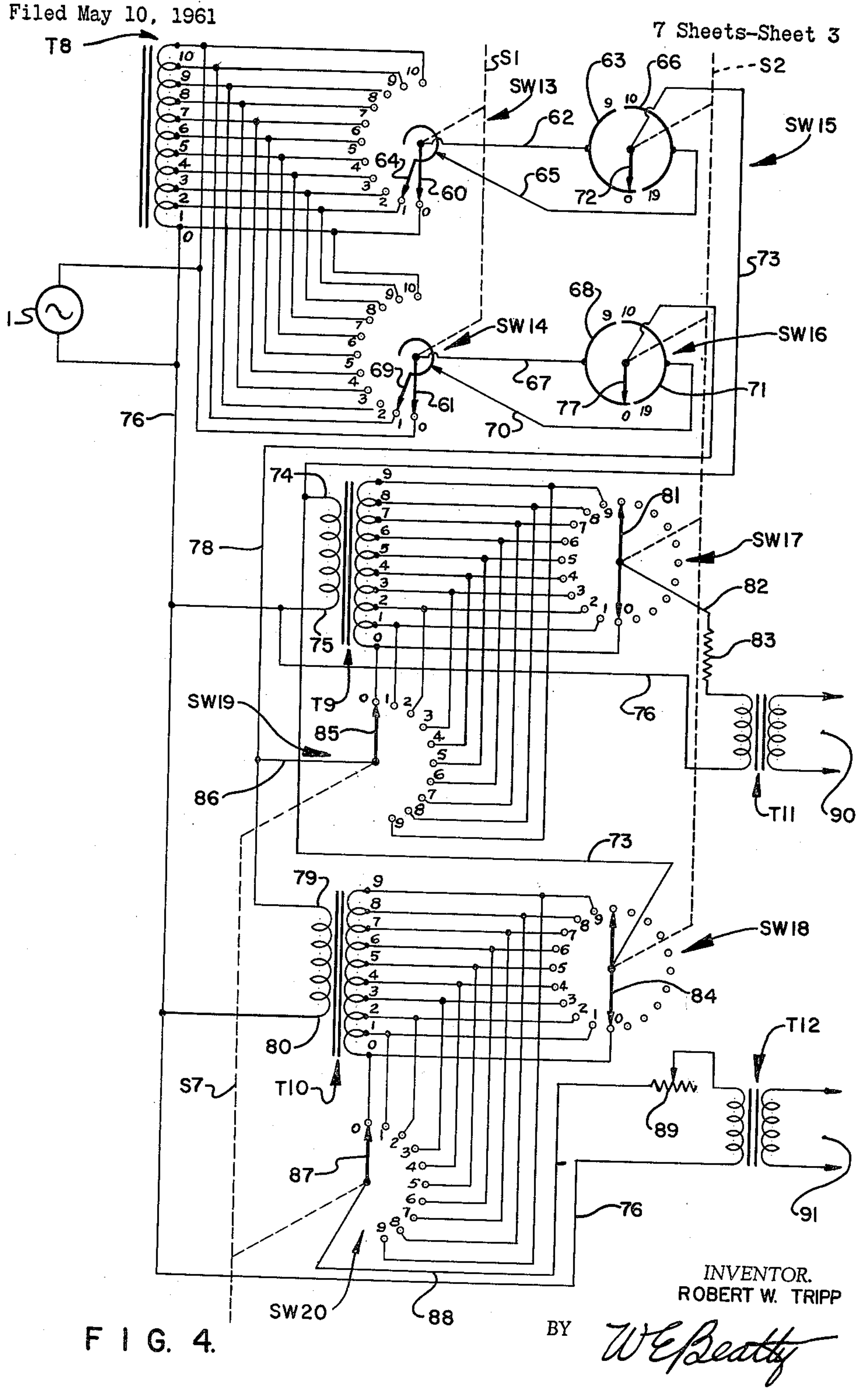
FIG. 4 is a similar detail of the digital-to-analog converter in the coarse block in FIG. 2.

FIG. 4 is a diagram of the coarse converter. While it is basically similar to the converter of FIG. 3, it differs in that the converter of FIG. 3 is adapted to divide the electrical cycle into a thousand parts, and the converter of FIG. 4 is adapted to divide the electrical cycle into 400 parts. Furthermore, since the first digit which corresponds to the division of the electrical cycle into four parts is not necessary for machines having travels of less than 100 inches, this stage of the converter is omitted. An A.C. voltage from oscillator 1 is applied to taps zero and 10 of transformer T8. The taps of transformer T8 are connected to the correspondingly numbered contacts on switch SW13 directly, and in the reverse sequence to the taps of switch SW14. Since the voltage at any tap on transformer T8 is proportional to the sine of the angle equal to 9 degrees multiplied by the number of the tap, and since the sine of 90 degrees is equal to the cosine of zero degrees, the voltage at the swinger 60 of switch SW13 will be proportional to the sine, and the voltage at the swinger 61 of switch SW14 will be proportional to the cosine of the angles represented by rotation of shaft S1. Swinger 60 is connected through wire 62 to the extended contact 63 which covers a range of positions of zero to 9 on switch SW15. Swinger 64, positioned 1 step in advance of swinger 60 on switch SW13, is connected by wire 65 to the extended contact segment 66 which covers positions 10 to 19 on switch SW15. Similarly, swinger 61 is connected by wire 67 to segment 68 of switch SW16 and advanced swinger 69 is connected by wire 70 to segment 71 of switch SW16. The swinger 72 of switch SW15 is connected by wire 73 to the high input 74 of the primary of transformer T9. The low side 75 of this primary is connected by wire 76 to tap zero on transformer T8 and to the common of oscillator 1. Likewise, swinger 77 of switch SW16 is connected by wire 78 to the high side 79 of the primary of transformer T10. The low side 80 of this primary connects through wire 76 to the common of oscillator 1.

The voltages at the secondary taps of transformer T9 and T10 correspond to the tangent of the angle obtained by multiplying the number of the tap by 0.9 degrees. The taps on transformer T9 are connected to like numbered contacts on switches SW17 and SW19. Likewise, the taps on transformer T10 are connected to like numbered contacts on switches SW18 and SW20. The double-ended swinger 81 of switch SW17 is connected by wire 82 to resistor 83 which connects to one side of the primary of transformer T11. The other side of the primary of T11 is connected by wire 76 to the common of oscillator 1. Double-ended swinger 84 of switch SW18 is connected by wire 73 to the high side 74 of the primary of transformer T9. Swinger 85 of switch SW19 is connected by wire 86 to the high side 79 of the primary of transformer T10. Swinger 87 of switch SW20 is connected by wire 88 through variable resistor 89 to one side of the primary of transformer T12. The other side of the primary of T12 is connected by wire 76 to the common of oscillator 1. The voltage from the secondary 90 of transformer T11 is proportional to the cosine of the sum of the angles represented by the positions of shafts S1 and S2, while the output from secondary 91 of transformer T12 is proportional to the corresponding sine.

Switches SW13 and SW15 cooperate to perform the carry between shafts S2 and S1 in the same manner that switches SW5 and SW7, FIG. 3, cooperate to perform the carry between shafts S6 and S5. Likewise, the functions of switches SW14 and SW16 correspond to those of switches SW6 and SW8 of FIG. 3. In a like manner, switch SW17 corresponds in its function to switch SW9, and switch SW18 corresponds to switch SW10. Further, switches SW19 and SW20 mounted on shaft S7 correspond to switches SW11 and SW12 mounted on shaft S9 and perform the function of permitting a single digit offset of the data for the purpose of zeroing the data elements.

Since 10 steps of shaft S1 do not represent a full 360-degree electrical cycle, the rotation of shaft S1 is limited by means not shown to 10 positions so that advanced swingers 64 and 69 do not move beyond contact 10 on switches SW13 and SW14.

FIG. 13 is a simplified schematic of the circuit of FIG. 4. It will be noted that this is essentially the same as FIG. 12, except that only 2 stages of the converter are employed and that different transformers are used.

Figures 8, 9:
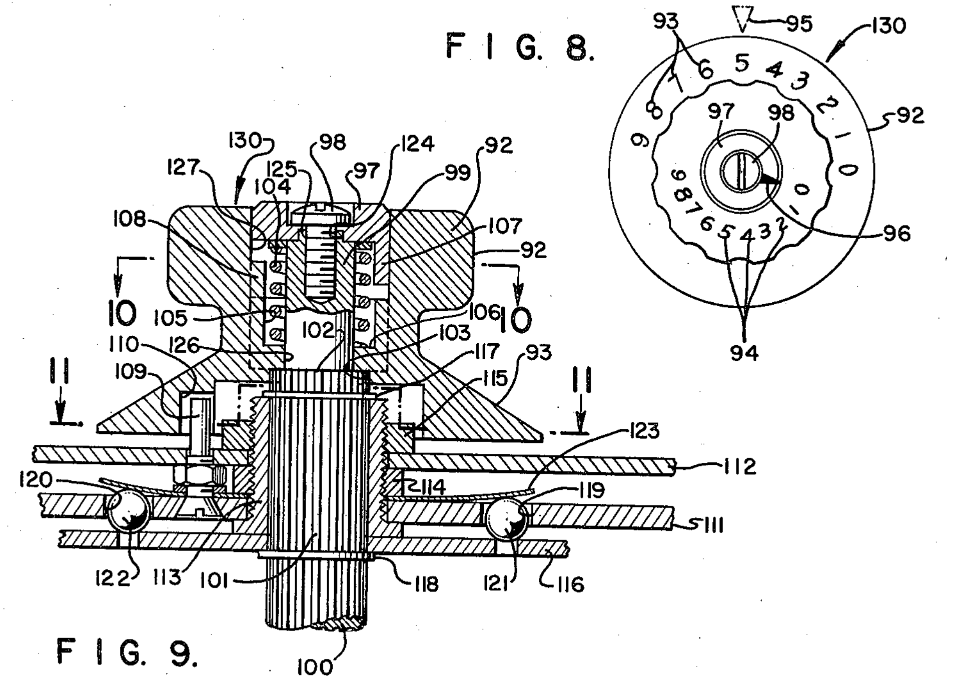
FIG. 8 is a plan view of one of the 6 identical knobs shown in FIG. 2 for the introduction of the numerical data.
FIG. 9 is an enlarged vertical sectional view through one of the knobs of FIG. 8.
Figures 10, 11:
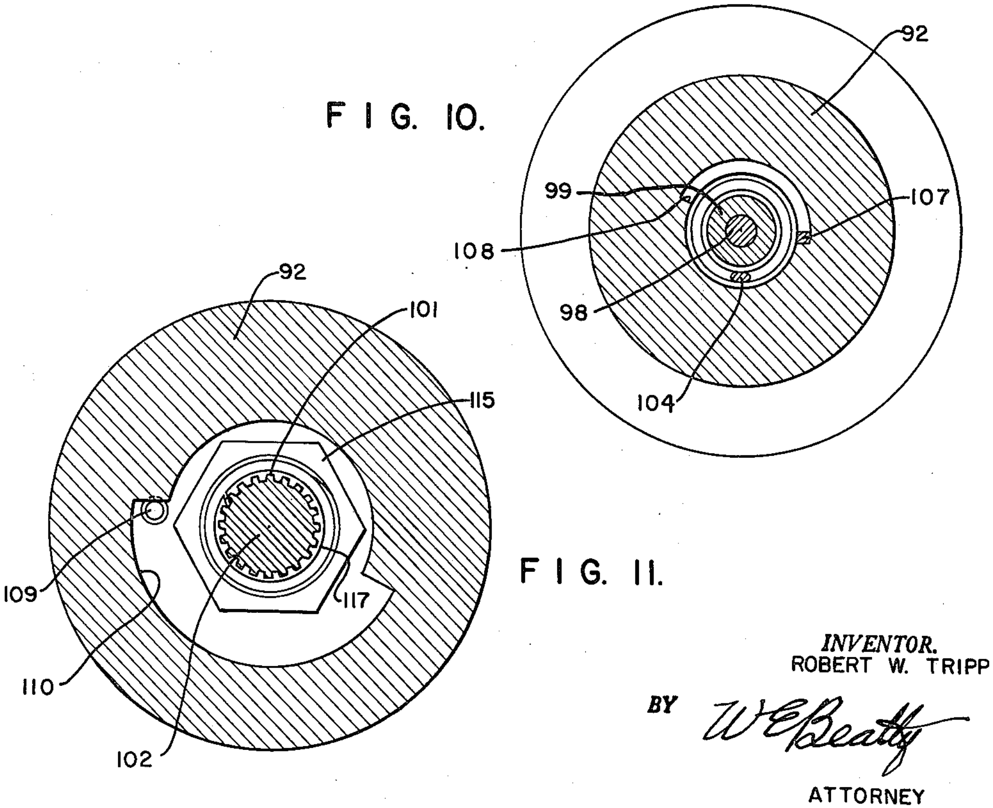
FIGS. 10 and 11 are cross sectional views on lines of the corresponding numbers in FIG. 9, looking in the direction of the respective arrows.

FIG. 8 shows a front view of knob 92 showing an outer scale 93 and an inner scale 94. Scale 93 is read with reference to fixed index 95, while scale 94 is read with respect to shaft index 96. Index 96 is engraved on the surface of stop member 97, which is secured to the reduced section 99 of shaft 100 by screw 98.

Referring to FIG. 9, the shaft 100 is typical of the shafts S1 to S6 in FIGS. 3 and 4 and has a spline indicated at 101 throughout its entire length for ease of connecting thereto the various swingers previously described. In FIG. 9, the upper end 102 of this spline is employed as an element making it possible to couple the knob 92 with or uncouple it from the shaft. For this purpose, the knob 92 has a mating spline 103, and the knob 92 is resiliently urged in a direction to couple the splines 102 and 103 together by a spring 104 which is mounted in a spring barrel 105 formed by a recess in the knob 92. Spring 104 bears at its upper end against the underside of stop 97, and at its lower end against the end 106 of the spring barrel.

The spline 101 has 20 equally spaced teeth. Consequently, knob 92 can be engaged with shaft 100 at intervals of 18 degrees. The relationship of the spline end 102, the mating spline 103 in the knob 92, the shaft index 96 and the scale 94 is such that when the knob is engaged with the shaft, the index 96 will be in alignment with a number of scale 94. A tongue 107 on stop 97 is arranged to engage stop 108, which is part of knob 92, to limit the relative rotation between knob 92 and shaft 100 so that shaft index 96 cannot rotate beyond the ends of scale 94. A stop screw 109 mounted to subpanel 111 extends through main panel 112 to engage stop groove 110 in knob 92. The position and extent of stop groove 110 is such that in combination with stop screw 109, knob 92 is limited in rotation so that scale 93 cannot rotate beyond fixed index 95. Shaft 100 is mounted for rotation by bushing 113 which is secured to subpanel 111 by nut 114 and to main panel 112 by nut 115. A detent plate 116 which contains 20 equally spaced holes on a common radius is secured against rotation to shaft 100 by spline teeth which engage the splined extended shaft portion 101. Shaft 100 and detent plate 116 are secured against longitudinal motion by retaining rings 117 and 118 which engage grooves in shaft 100. Diametrically opposite holes 119 and 120 in subpanel 111 and lying on the same radius as the holes in detent plate 116 contain balls 121 and 122 which are urged against detent plate 116 by a leaf spring 123. Leaf spring 123 is secured to subpanel 111 by nut 114 and bushing 113.

Stop 97 is secured against rotation to shaft 99 by having a hole 124 which has one or more flats therein to engage a corresponding projection 125 on shaft 99. The cylindrical surface 126 of knob 92 engages shaft 99, and the cylindrical surface 127 of knob 92 engages stop 97 for rotational and longitudinal sliding motion between knob 92 and shaft 100. Stop 97 and knob 92 cooperate to limit the amount that the knob can be pulled out along shaft 99 against the force of spring 104, the travel being so limited that stop screw 109 does not disengage from groove 110.

Subpanel 111 serves as a convenient support for mounting the stationary portions of the various switches, like SW1 through SW10, while splined shaft 101 serves to mount and rotatably position the swingers of these same switches.

Knob 92 and the associated parts described in FIGS. 8 through 11 are identified as knob assembly 130. From the preceding description it can be seen that knob 92 can be rotated with respect to shaft 100 through the 10 discrete positions indicated by scale 94 and index 96. In addition, the knob can be rotated with respect to the panel through a range of 10 discrete positions as indicated by scale 93 and index 95. It will be noted that clockwise rotation of knob 92 with respect to index 95 causes the numbers on scale 93 to increase, while clockwise rotation of shaft 100 with respect to knob 92 causes index 96 to indicate increasing numbers on scale 94. Thus, the number of steps through which shaft 100 is rotated from the position which it would occupy when both scales are at zero with respect to their indices is equal to the sum of the two numbers indicated on scales 93 and 94. The shaft position measured from the above defined zero will be the sum of the two indicated digits multiplied by 18 degrees. In other words, the position of the shaft 100 is offset from the reading on dial 93 by the value of the reading on dial 94.

In general, the zero of the coordinate system of dimensioning of a workpiece as set up on a machine will not coincide with the zero of the coordinate system of the numerical control. It is therefore necessary to obtain an offset which corresponds to the difference between the zeros in the two co-ordinate systems. FIG. 5 illustrates the method of accomplishing this when the zero of the workpiece co-ordinate system is available on the workpiece. In this case, the workpiece 148 is positioned by moving the machine until the co-ordinate zero 149 of the workpiece is in alignment with the work point 150. The inner scale 94 of each of the knob assemblies 130 is set to zero with respect to its index 96 by pulling outwardly on knobs 92 and turning to this position. The knobs 92 are then released to engage the shafts S1 to S6 at this zero position. The various knobs 92 are now rotated until a null is obtained on null meter 140. The multidigit number now read between scales 93 and indices 95 of the respective knobs represents the numerical value of the zero offset. In the example shown, this is 08.7500. For convenience in inserting new input data representative of other work points, it is necessary to transfer the zero offset number from the outer scales 93 to the inner scales 94 and to simultaneously transfer the zero data position from scales 94 to scales 93. This is accomplished by pulling outward on each knob 92 to disengage it from its respective shaft 100, and rotating the knob until the pair of numbers is interchanged. It will be noted that the construction of the knob assemblies 130 is such that transfering the number from one scale to the other automatically results in the simultaneous transfer of the number on the other scale to the first. A new work point dimension, for example, 18.2946 as shown on FIG. 5, may now be set on the outer scales 93. The inner and outer scales will appear as in FIG. 15. The decimal point is indicated at 163 on FIGS. 14 and 15. When the null meter 140 is now returned to zero by appropriately moving the machine table 162, the new co-ordinate point 151 on the workpiece will be aligned with the work point 150.

The machine can be positioned to obtain the null of meter 140 by manual means such as a hand crank or reversible motor and jog control, or automatically by a conventional servo drive.

When the zero offset number is known, as for example when it was obtained from a previous setup of the same part on the same machine, it can be inserted directly on the inner dials 94.

In many cases the reference starting dimension for the workpiece will be at a co-ordinate position other than zero. In FIG. 6, the starting point 161 has a coordinate value of 18.2946. This number is inserted in the inner dials 94. The machine table 162 is positioned so that point 161 is in alignment with the work point 150. The knobs 92 are now adjusted to bring the null meter 140 to zero. At this time the inner dials 94 show the starting dimensions, and the outer dials 93 show the zero offset value of 08.7500 thus obtained, and appear as in FIG. 14. These numbers are now interchanged as previously described by pulling out each knob 92 to disengage it from its shaft 100 and rotating it so that the number that was originally on the outer dial 93 appears on the inner dial 94. This automatically transfers the number on the inner dial 94 to the outer dial 93. As a result, the zero offset dimension is now on the inner dials and the starting dimension on the outer dials, as shown in FIG. 15. It should be noted that the interchange of numbers between the inner and outer scales is accomplished by rotation of the knobs with no rotation of their shafts and that for a fixed position of a shaft the sum of the numbers read on the inner and outer scales is a constant. New work co-ordinates can now be inserted on the outer dials 93 by rotation of the knobs 92.

FIG. 7 is a schematic representation of a triple Inductosyn which can be conveniently used as a multiple data element in conjunction with the invention.

The triple Inductosyn scale member 153 carries on it a fine scale pattern 154, a medium scale pattern 155, and a coarse scale pattern 156. The triple Inductosyn slider member 157 carries a pair of fine slider patterns 158, medium slider patterns 159, and coarse slider patterns 160. The fine pattern has an electrical cycle equivalent to one-tenth of an inch, the medium pattern a cycle equivalent to 10 inches, and the coarse pattern a cycle equivalent to 400 inches. Each of the slider patterns 158, 159 and 160 comprises a pair of windings having the same cycle length as their respective scale patterns, one winding of the pair being mechanically displaced from the other by one-quarter of the respective cycle. This provides the correct trigonometrical relationship between the windings to utilize the sine and cosine voltages developed by the converters 131, 132 and 133. The details of the triple Inductosyn are disclosed and claimed in patent application S.N. 29,972 referred to above.

While the embodiment of the invention is described above as used with a three-speed system for control of linear motion, it is equally applicable, by a suitable choice of transformers and connections to systems having more or fewer speeds, other cycle lengths, and for control of rotary motion. Likewise, by suitable choice of transformers and connections the invention can be applied to data elements such as synchros having other trigonometric relationships.

I claim:

1. A digital-to-analog converter comprising a first means for supplying a digital input in terms of travel of a driven element, a second means for supplying a digital input in terms of travel of said element, a rotary switch, said switch having a shaft under control of both of said first and second means to operate to positions corresponding to the sum of said first and second digital inputs, a data element having relatively movable and fixed members, one of said members having input windings with a geometrical spacing, said rotary switch providing to said input windings adjustable amounts of input voltage having a trigonometrical relation corresponding to said geometrical spacing.

2. A digital-to-analog converter comprising a first means for supplying a digital input in terms of travel of a driven element, a second means for supplying a digital input in terms of travel of said element, a computer, said computer being under control of a shaft on which both of said first and second means are mounted, a data element having relatively movable and fixed members, one of said members having input windings with a geometrical spacing, said computer providing to said input windings adjustable amounts of input voltage having a trigonometrical relation corresponding to said geometrical spacing.

3. A digital-to-analog converter according to claim 1, said first and second means each comprising a dial coupled to said shaft.

4. A digital-to-analog converter comprising two or more decimally related digital input stages, means for setting a first multidigit decimal number, means for setting a second multidigit decimal number, said numbers having corresponding digital groups of the same significance, and switch means having a shaft on which both of said setting means are mounted for obtaining an analog output corresponding to the sum of said numbers, further means providing an input of a single digit in the stage corresponding to the least significant figure and means providing an analog output which is the sum of said single digit and said first and second numbers.

5. A digital-analog converter according to claim 4, said further means comprising an independently operable rotary switch.

6. A digital-to-analog converter comprising two or more decimally related digital input stages, each stage having (*a*) means for setting a first multidigit decimal number, and (*b*) means for setting a second multidigit decimal number, said numbers having corresponding digital groups of the same significance, and each stage having a shaft controlled by both of its said setting means for obtaining an analog output corresponding to the sum of said numbers, further means providing an input of a single digit in the stage corresponding to the least significant figure and means providing an analog output which is the sum of said single digit and said first and second numbers for that stage.

7. A digital-to-analog converter comprising two or more decimally related digital input stages, means for setting a first multidigit decimal number, means for setting a second multidigit decimal number, said numbers having corresponding digital groups of the same significance, means for summing said first and second numbers, said summing means being adapted to sum corresponding digits in said numbers, means for carrying from the less significant to the more significant stage, the portion of said means in the less significant stage comprising a first switch adapted to select a first conductor when said sum of corresponding digits is 9 or less or a second conductor when said sum exceeds 9, the portion of said means in the more significant stage comprising second and third switches, said second switch being adapted to select voltages corresponding to the numbers 0 to 9 and said third switch being arranged to select voltages corresponding to the numbers 1 to 10, said second switch being connected to said first conductor and said third switch to said second conductor.

8. A digital-to-analog converter comprising a first means for supplying a digital input in terms of travel of a driven element, a second means for supplying a digital input in terms of travel of said element, a rotary switch, said switch being under control of both of said first and second means to operate to positions corresponding to the sum of said first and second digital inputs, a data element having relatively movable and fixed members, one of said members having input windings with a geometrical spacing, said rotary switch providing to said input windings adjustable amounts of input voltage having a trigonometrical relation corresponding to said geometrical spacing, said switch having a shaft, said first means comprising a dial settable with respect to an index mark on said shaft, said second means comprising a second dial rigidly attached to said first dial and having a fixed index.

9. A digital to analog converter comprising decimally related input stages, each having a transformer, one of said stages having a first set of rotary switches having a first shaft, another stage having a second set of rotary switches having a second shaft, each shaft controlling output taps from one of said transformers each having sets of taps arranged respectively according to respective trigonometric values corresponding to geometrical spacing of data element windings, the said sets of taps representing decimally related groups of digits, the effect on the output voltage of one step of the shaft of said first switch being the same as 10 steps of the shaft of said second switch, said switches and transformers having connections for supplying signal values proportional to the related trigonometrical values of the sums of the electrical angles related to the travel corresponding to the digits of said groups, and a carry switch for each switch of said first set of switches, each of said carry switches having a swinger on said second shaft for carrying the excess 10 on said second shaft to the preceding stage on said first shaft by advancing the connections to the taps of the transformers at said one stage by one step.

10. A digital to analog converter comprising at least two decimally related input stages, a first stage having a transformer having an input and a secondary winding having a number of spaced taps, a first switch having a double set of a greater number of numbered contacts at regularly spaced positions, said taps being connected to corresponding ones of a portion of said numbered contacts, said first switch having a first shaft having two double ended swingers of which one is in advance of the other by an amount equal to the spacing of said numbered contacts, a succeeding input stage having a carry switch having a second shaft having a single ended swinger, said carry switch having corresponding positions and having, for its said swinger, an extended contact in the range of 10 and more positions in circuit with the advanced one of said double-ended swingers, said carry switch also having, for its said swinger, an extended contact in the range of 0 to 9 positions in circuit with the other of said double-ended swingers, and an output line for the said swinger of said carry switch.

11. A digital to analog converter according to claim 9, the shaft of said first stage having means for stopping said shaft at more than 10 positions of which positions 0 to 9 appear on a scale on a knob for said first shaft, said scale having a fixed index, a number of other positions appearing in opposite sequence on a second scale on said knob, an index on said shaft for said second scale, and means for selectively engaging said knob to said first shaft at discrete positions corresponding to the numbers on said second scale.

12. A digital to analog converter according to claim 9, the shaft of each stage having separate means for stopping each shaft at more than 10 positions of which positions 0 to 9 appear on a scale on a knob for each shaft, each scale having a fixed index, a number of other positions appearing in opposite sequence on a second scale on the knob for each shaft, an index on each shaft for its said second scale, and separate means for selectively engaging each knob to its said shaft at discrete positions corresponding to the numbers on its said second scale.

13. A digital to analog converter comprising two or more decimally related digital input stages, each stage having (*a*) means for setting a first multidigit decimal number, and (*b*) means for setting a second multidigit decimal number, said numbers at each stage having corresponding digital groups of the same significance, and each stage having a shaft controlled by both of its said setting means for obtaining an analog output corresponding to the sum of its said numbers.

14. A digital to analog converter comprising a manually operable knob having thereon a first scale having numbers for measurement of its angular position with respect to a fixed index and a second scale thereon having numbers for measurement of its angular position with respect to a shaft, and means for selectively engaging said knob to said shaft at discrete positions corresponding to said numbers on said second scale, a transformer having an input and a secondary winding having taps extending to spaced contacts, said shaft having a wiper controlling said spaced contacts, the spacing of said contacts and of the numbers on both of said scales being the same, the numbers on said scales being arranged on complementary portions of said knob and having values increasing in opposite directions circumferentially of said knob.

15. A digital to analog converter according to claim 14, said knob and said shaft having interfitting separable splines each having a module corresponding to said spacing, and spring means urging said splines in coupling relation.

16. A digital to analog converter having at least two decimally related stages and comprising a rotary switch having a shaft and an adjustable knob on said shaft, said knob having two scales each having numbers 0 to 9, said scales appearing in opposite sequence on complementary portions of the circumference of said knob, a fixed index for one of said scales, an index on said shaft for the other scale, said shaft having 20 rotary positions and having a wiper, an input circuit having at least 10 leads connected to contacts for said wiper at corresponding switch positions, means having a module the same as the number spacing on both of said scales for selectively engaging said knob with said shaft in various positions corresponding to the sum of the readings on said scales, and switching means for carrying the surplus 10 at one stage as 1 at a preceding stage, when the sum of the readings on said scales is greater than 9, at the said one stage where said rotary switch is provided.

17. A digital to analog converter wherein a rotary switch according to claim 16 is also provided for said preceding stage.

References Cited in the file of this patent

UNITED STATES PATENTS

| | | |
|---|---|---|
| 2,436,178 | Rajchman | Feb. 17, 1948 |
| 2,532,974 | Warner | Dec. 5, 1950 |
| 2,627,245 | Kimball | Feb. 3, 1953 |
| 2,764,344 | Wescott | Sept. 25, 1956 |
| 2,843,811 | Tripp | July 15, 1958 |
| 2,848,670 | Kelling et al. | Aug. 19, 1958 |
| 2,873,439 | Lahti et al. | Feb. 10, 1959 |
| 2,876,950 | Daykin | Mar. 10, 1959 |
| 2,987,661 | Schweitz | June 6, 1961 |

OTHER REFERENCES

Cooney and Ledgerwood: "31 Numerically Controlled Point-To-Point Positioning Systems," part 1 (Control Engineering, vol. 5, No. 1, January 1958), System 8, Farrand Controls, Inc., pp. 90, 91, FIG. 8.8, relied upon.